United States Patent

Seto

Patent Number: 5,490,096
Date of Patent: Feb. 6, 1996

[54] VISUAL SIMULATION APPARATUS

[75] Inventor: Koshi Seto, Kawasaki, Japan

[73] Assignee: Kabushiki Kaisha Toshiba, Kawasaki, Japan

[21] Appl. No.: 80,528

[22] Filed: Jun. 24, 1993

[30] Foreign Application Priority Data

Jun. 24, 1992 [JP] Japan ................... 4-165592

[51] Int. Cl.$^6$ .................................. G06F 17/00
[52] U.S. Cl. ................................. 364/578
[58] Field of Search .................... 364/488, 489, 364/490, 578, 579, 801, 802, 803

[56] References Cited

U.S. PATENT DOCUMENTS 4,970,664  11/1990  Kaiser et al. ................. 364/488
5,251,159  10/1993  Rowson ........................ 364/578

Primary Examiner—Ellis B. Ramirez
Attorney, Agent, or Firm—Oblon, Spivak, McClelland, Maier & Neustadt

[57] ABSTRACT

A CPU is connected to a memory storing programs for operating the CPU and a number of simulators, a display unit and a mouse for pointing a particular data shown on said display unit as well as to other devices. A number of windows are arranged on the display screen of the display unit to show the simulated operation of the processors disposed in a target apparatus, that of the keys also arranged in the target apparatus for operating the latter and that of the display unit arranged in the target apparatus for 7-segment digit presentation. When a particular key is pointed by the mouse, the CPU sequentially executes the simulators that correspond to the pointed key. The obtained results of simulation are displayed on the related windows of the display unit.

14 Claims, 4 Drawing Sheets

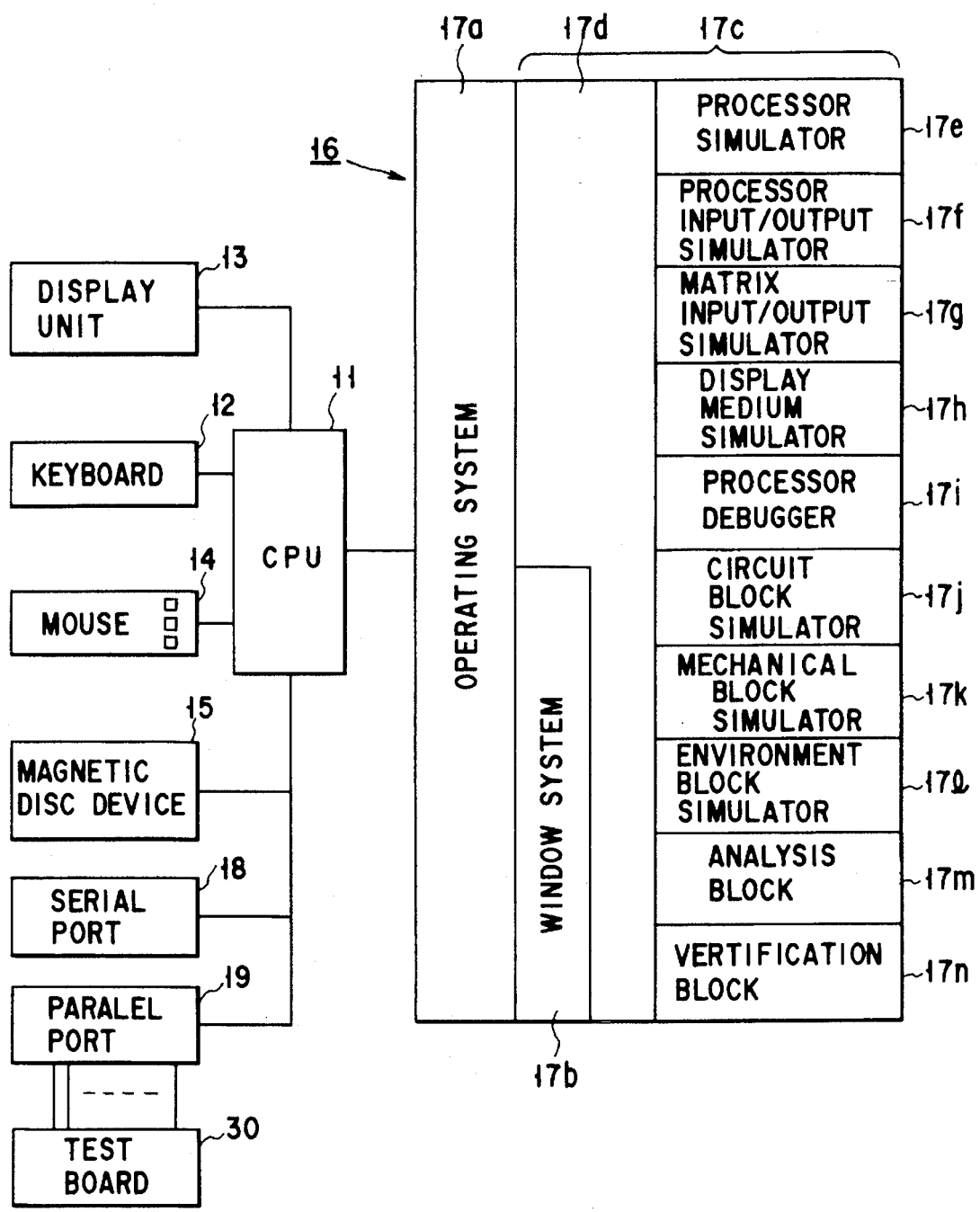
F I G. 1

VISUAL SIMULATION APPARATUS

BACKGROUND OF THE INVENTION

1. Field of the Invention

This invention relates to a visual simulation apparatus to be suitably used for the development of programs for operating processors incorporated in electronic equipment such as a radio and the like.

2. Description of the Related Art

Programs for operating processors incorporated in an electronic apparatus such as a radio are normally prepared by editing and assembling source files on a host computer which are then down-loaded on an emulator connected to the apparatus that incorporates the processors, where the programs will be debugged. The operation of down-loading programs on an emulator is, however, rather time consuming.

The time required to down load programs on an emulator can be reduced by providing the host computer with simulation programs for the target apparatus. Then, the effect of reducing the time required for developing programs can become more remarkable because all the works to be done for the program development can be carried out on the host computer.

A simulation apparatus equipped with programs for carrying out simulating operations normally comprises personal computers and engineering work stations (EWSs) as principal components and the construction and operation of the target apparatus can be simulated by using the simulation programs stored in the EWSs. The simulation apparatus displays the results obtained by the simulating operation for the target apparatus on a display unit which is also a component of the simulation apparatus.

FIG. 5 of the accompanying drawings illustrates a set of information displayed on the display screen of the display unit of a conventional simulation apparatus. The information on the display screen includes the contents of the source list 1 for a processor to be incorporated in the target apparatus, the contents of the basic registers 2 including the program counters, the memory dump list 3 and the commands 4 entered into the simulation apparatus.

A conventional simulation apparatus having a configuration as described above is designed to simulate the construction and operation of a processor chip only, and to operate in such a simple manner as to delay a signal transmitted from an output terminal by a given period of time and to supply the delayed signal to an input terminal. Therefore, it is normally not capable of simulating on a real-time basis the operation of peripheral devices such as a key matrix for a number of switches and a liquid crystal display unit if the target apparatus is a radio.

Accordingly, the conventional simulator can be used only in the initial stage of the developing a soft-ware, and it is difficult with such a simulator to simulate the operation of the target apparatus as a real apparatus.

SUMMARY OF THE INVENTION

It is, therefore, an object of the present invention to provide a visual simulation apparatus that can simulate the operation of a target apparatus including that of the peripheral devices it comprises on a real-time basis and display the results of the simulating operation on a display unit also on a real-time basis.

According to the invention, the above object is achieved by providing a visual simulation apparatus comprising:

a control unit;

display means, connected to said control unit, for displaying first, second and third windows in which data are displayed;

designating means, connected to said control unit, for designating data displayed on said first, second and third windows: and memory means, connected to said control unit, for storing programs for controlling the operation of said control unit;

said memory means including:

first simulation means for simulating the operation of a processor incorporated in a target apparatus, said first simulation means comprising an arithmetic logical unit constituting a component of said processor, a memory for storing programs for operating said processor and an input/output control section of said processor for controlling data input/output operations, said first simulation means simulating the operation of said processor in accordance with said programs;

second simulation means for simulating the input and output signals passing through an input/output terminal connected to said input/output control section of said processor third simulation means for simulating the operation of a key matrix to be used for operating said target apparatus, said third simulation means supplying the results of simulation to said second simulation means;

fourth simulation means for simulating the operation of the display unit of said target apparatus in accordance with the results of simulation transmitted from said first simulation means; and window control means for displaying the results of simulation by said second simulation means on said first window, those of simulation by said third simulation means on said second window and those of simulation by said fourth simulation means on said third window.

Now, the present invention will be described in greater detail by referring to the accompanying drawings that illustrate a preferred embodiment of the invention.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a schematic diagram showing the configuration of a preferred embodiment of the invention;

DETAILED DESCRIPTION OF THE PREFERRED EMBODIMENT

Figure 2:
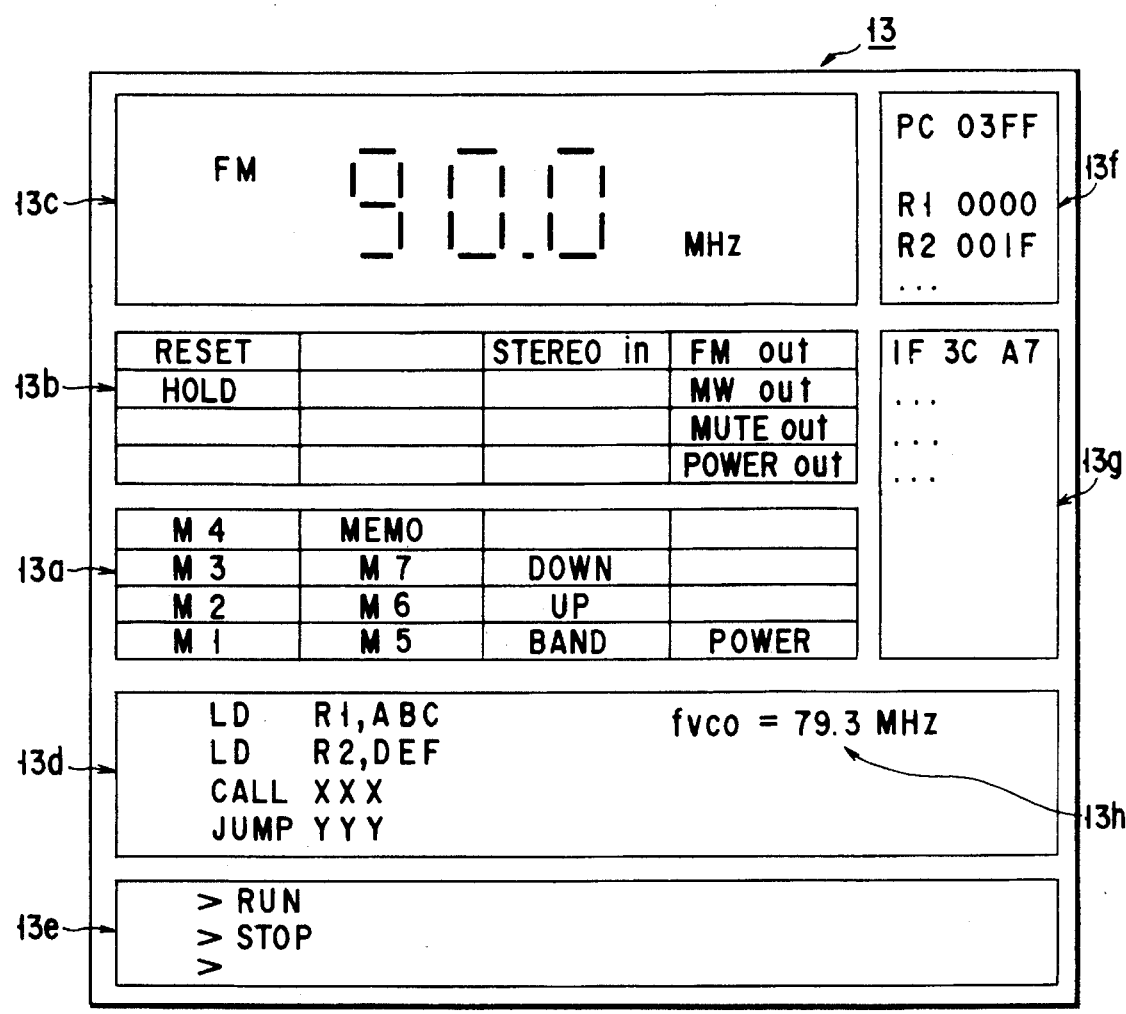
FIG. 2 is a plan view of the display screen of the display unit of the embodiment of FIG. 1, showing exemplary data displayed on the windows of the display unit.

FIG. 1 illustrates a preferred embodiment of the simulation apparatus of the invention. Central processing unit (CPU) 11 is connected to a keyboard 12 for entering various commands and data necessary for driving simulators and debuggers to operate and a display unit 13, typically a CRT display unit, for displaying on its display screen the data entered to and showing the results of simulating operations carried out by the CPU 11. The CPU 11 is also connected to a mouse 14 which is a device for pointing to a particular data out of a set of data displayed on the display screen of the display unit 13 and a magnetic disc device 15 for storing programs to be ultimately stored in a processor (e.g., a 4 bit μ-computer) of a target apparatus that can be a combination of a radio and a cassette tape recorder and simulated by the embodiment.

The CPU 11 is also connected to a serial port 18 such as a RS-2332C and a parallel port 19 such as an 8-bit printer port available from Centronics Corp, which in turn is connected to a test board 30 for the target apparatus so that the test board 30 may be tested whenever necessary.

The CPU 11 is further connected to a memory 16 such as a random access memory (RAM), which stores an operating system 17a, a window system 17b and a simulator 17c, of which the operating system 17a controls the entire system and the window system 17b arranges windows, causes data to be displayed on the windows and so operates as to transmit data on the position of the data indicated by the mouse 14 on one of the windows, while the simulator 17c simulates the operation of the target apparatus. The operating system 17a, the window system 17b and the simulator 17c are normally stored in the magnetic disc device 15 and will be loaded on the memory 16 from the magnetic disc device 15 when the systems start to operate.

FIG. 2 is a plan view of the display screen of the display unit of the embodiment of FIG. 1, showing exemplary data displayed on the windows of the display unit when the target apparatus is a radio combined with a cassette tape recorder.

Of the windows, window 13a is designed to simulate the key matrix provided to operate a number of switches of the radio and typically display the statuses of a power key (POWER) for turning on/off the power supply, station preselection keys (M1 through M7), a key (MEMO) for storing the frequencies of the preselected broadcasting stations, a band switch key (BAND) for selecting either FM or MW and a key (UP, DOWN) for shifting from a preselected frequency to a preselected next higher or lower frequency. The keys for operating the cassette tape recorder are omitted there in order to simplify the description below.

Window 13b simulates the input/output (I/O) terminals of the processor and display the statuses of stereo mode (STEREO in), FM mode (FM out), MW mode (MW out) and mute mode (MUTE out) which suppresses sounds that may be emitted when a broadcasting station is tuned in.

Window 13c simulates the liquid crystal display unit of the target apparatus and displays the data supplied by the input/output control section of a processor simulator 17e, which will be described in greater detail hereinafter. The window 13c typically displays the frequency of the selected broadcasting station when the target apparatus is operating as a radio, whereas it displays the direction along which the tape is running if the apparatus is operating as a cassette tape recorder. In FIG. 2, each of the digits used to show a frequency for FM broadcasting comprises seven segments.

Window 13d is used to display a program list, which typically includes source programs and an assemble list stored in a read only memory of the processor simulator 17e as well as data 13h necessary to verify the contents of the window 13c by operating a verification block, which will be described in greater detail hereinafter. The source programs displayed in the window 13d can be scrolled up and down and any of the programs displayed there can be debugged.

Window 13e is designed to sequentially display the commands entered by way of the keyboard 12.

Window 13f is used to display the conditions under which the processor is operating. More specifically, the window 13f displays the contents of the program counter (PC) and the registers (R1, R2, . . . ) being simulated by the processor simulator 17e.

Window 13g is designed to display the data stored in the RAM of the processor simulator 17e and dumped by the simulator. The data stored in the RAM are displayed in hexadecimal digits in the window 13g.

The simulator 17c shown in FIG. 1 comprises a plurality of programs, of which main program 17d controls the operation of the entire simulation programs. The main program 17d supplies various simulators and debuggers that will be described in greater detail hereinafter with data entered by way of the keyboard 12 and/or the mouse 14 by utilizing a window system 17b. The main program 17d also supplies the window system 17b with data on the results of the simulating activities carried out by the simulators and updates the data displayed on the display unit 13 by way of the window system 17b according to the most recent results of simulation. The results of simulation transmitted from the simulators may alternatively be displayed by way of the window system 17b without passing through the main program 17d.

Processor simulator 17e is designed to simulate the operation of a processor of the target apparatus. More specifically, if the processor comprises components as illustrated in FIG. 3, it simulates the arithmetic logical unit (ALU) 21., the ROM 22, the RAM 23, the input/output control section 24 by using the data supplied from the main program 17 and the programs stored in the magnetic disc device 15 for the target apparatus.

Figure 3:
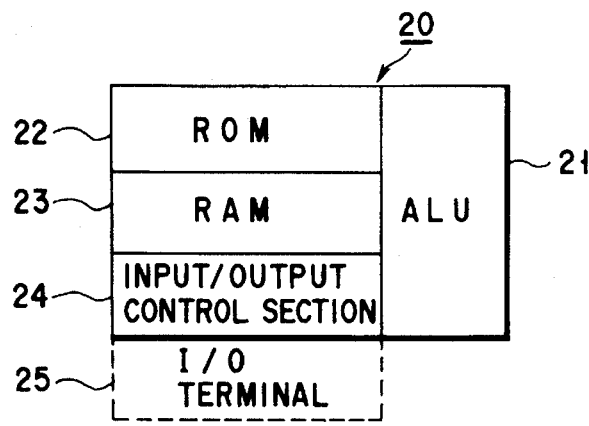
FIG. 3 is a schematic diagram showing the configuration of a processor whose operation is simulated by the processor simulating section of the embodiment of FIG. 1.

Processor input/output simulator 17f in FIG. 1 simulates the status of the I/O terminal 25 of the processor 20 of the target apparatus as illustrated in FIG. 3. The processor input/output simulator 17f determines if the input/output terminal of the processor is at a high level or a low level depending on the results of simulation by a matrix input/output simulator 17g, which will be described in greater detail hereinafter.

The matrix input/output simulator 17g is designed to simulate the selective operation of the key matrix connected to the processor of the target apparatus. More specifically, it simulates the operation of a particular key specified by the mouse 14 out of the key matrix displayed on the window 13a, using the data given by way of the window system 17b and the main program 17d.

Display medium simulator 17h in FIG. 1 is used to simulate the operation of a display unit of the target apparatus such as a liquid crystal display of a radio. When a memory area of the RAM 23 allocated to the liquid crystal display is accessed, the display medium simulator 17h converts the data stored in that memory area into graphic data compatible with the window system 17b and the data display format of the liquid crystal display of the target apparatus. The converted data are then fed to the display unit 13 by way of the window system 17b to switch the data displayed on the liquid crystal display and hence on the window 13c of the display unit 13.

processor debugger 17i in FIG. 1 debugs the program for operating the processor. If, for instance, a particular position of a source program is pointed to by the mouse 14 to indicate a break point and then the program is executed, the execution of the program is halted at the pointed position. The contents of the program counter and the registers are then displayed in the window 13f under this condition so that they may be visually examined by observing the window 13f.

Circuit block simulator 17j simulates the operation of the circuits of a radio. For instance, it simulates the generation of an intermediate frequency signal by mixing a received high frequency signal and a locally oscillated signal and the operation of a PLL circuit it comprises for generating locally oscillated signals.

Mechanical block simulator 17k is designed to simulate the operation of the components such as the motor and the electromagnetic plunger of a tape recorder that operate with a lag.

Environment block simulator 17l is designed to simulate environmental factors such as the field strength of a radio wave received by the radio as a function of the distance between the broadcasting station transmitting the radio wave and the radio.

Analysis block 17m is a so-called logic analyzer that monitors the waveform of the output signal of a circuit and simulates the time required for a circuit to process a signal.

Verification block 17n is designed to simulate a program or a circuit block to see if it operates correctly in an intended manner. For instance, it may be used to see, when a frequency is displayed in the window 13c, if a shift to a higher frequency is observed by operating the UP key displayed on the window 13a. To carry out a verifying operation, commands need to be entered by way of the keyboard 12 in a programmed manner. In this case, the verification block 17n causes the window 13d to display the frequency 13h of the output signal of the local oscillator being supplied to an intermediate frequency amplifier (not shown) in accordance with the frequency displayed in the window 13c. Thus, the operation of the local oscillator and that of the liquid crystal display can be visually verified by observing the frequency 13h of the output signal of the local oscillator shown in window 13d and the frequency displayed in the window 13c.

Figure 4:
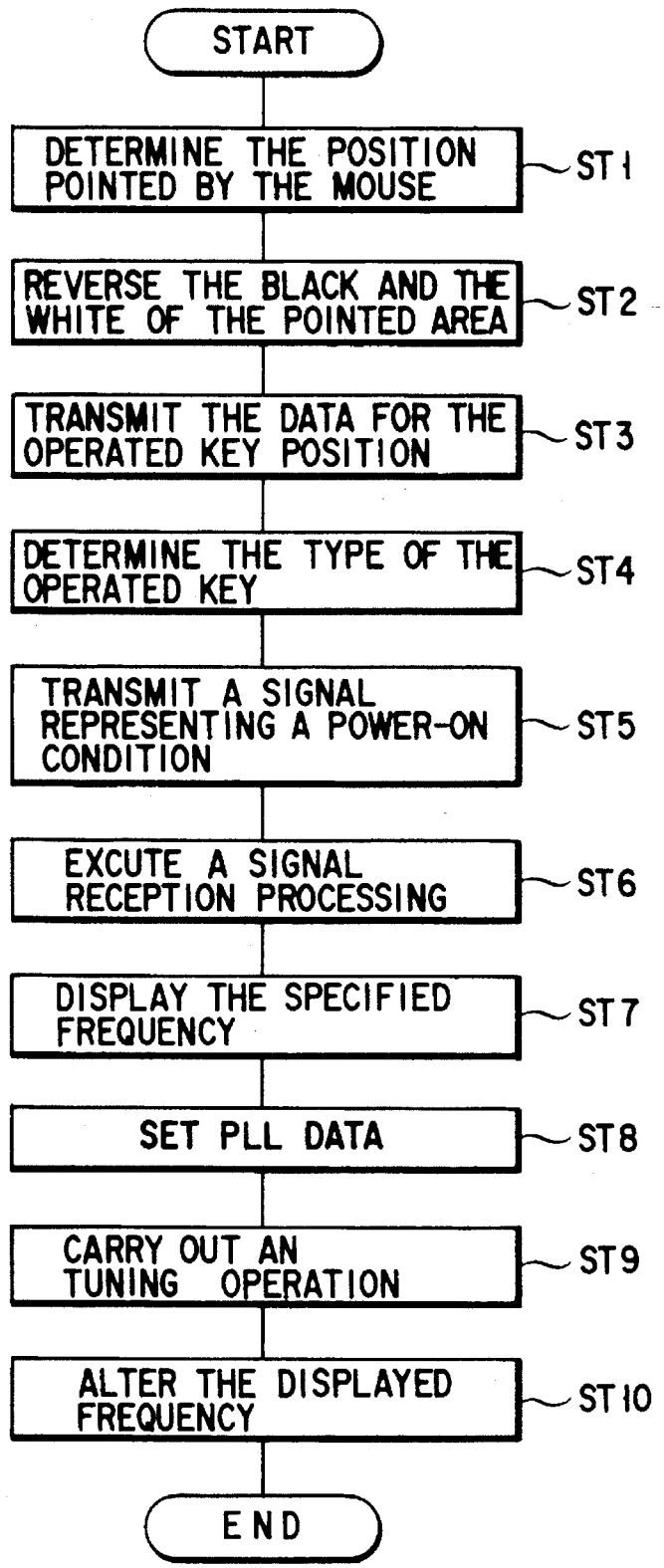
FIG. 4 is a flow chart showing how a simulating operation is carried out by the embodiment of FIG. 1.
Figure 5:
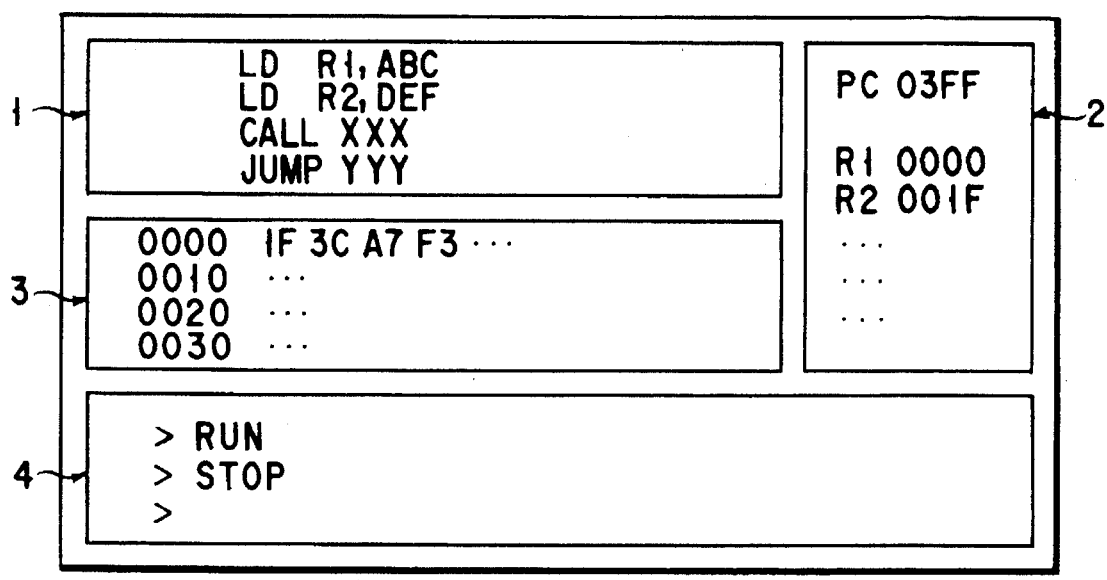
FIG. 5 is a plan view of the display screen of the display unit of a conventional simulation apparatus.

The embodiment having a configuration as described above operates for simulation in a manner as described below by referring to FIG. 4, if the target apparatus is a radio.

The windows 13a, 13b, 13d through 13g normally display data as illustrated in FIG. 2 when the system is caused to start, whereas the data displayed in the window 13c may vary depending on the type and the mode of operation of the target apparatus. The current time supplied by a clock (not shown) is displayed in the window 13c in the case of FIG. 2. If the power key (POWER) in the window 13a is pointed to by the cursor of the mouse 14 and the switch on the mouse 14 is depressed under this condition, the pointed position is determined by the window system 17b (ST1). Then, data for the determined position are fed to the main program 17d as well as to the processor simulator 17e and the matrix input/output simulator 17g. The main program 17d keeps on sending a signal to reverse the black and the white of the power key (POWER) section of the window 13a as long as the switch on the mouse 14 is depressed. Consequently, the black and the white of the power key (POWER) section is reversed by the window system 17b (ST2).

Then, the matrix input/output simulator 17g supplies the processor input/output simulator 17f with data for a position on the key matrix corresponding to the position specified on the window 13a (ST3). The processor input/output simulator 17f then sets the level of the processor I/O terminal high in response to the data for the position it receives as the terminal is connected to the selected position of the key matrix. The processor simulator 17e determines the selected key on the basis of the set level of the I/O terminal (ST4). Thereafter, the processor simulator 17e transmits a signal to various simulators including the circuit block simulator 17j by way of the main program 17d as a function of the selected key. Upon receiving the signal, the simulators carry out respective simulating operations as a function of the signal.

More specifically, since the power key (POWER) has been operated to activate the power source, the processor simulator 17e transmits a signal representing the activated condition of the power source to the circuit block simulator 17j (ST5). Upon reception of the signal, the circuit block simulator 17j executes a reception processing operation based on a frequency set at the time when the power was turned off last time, the frequency supplied from the processor simulator 17e (ST6). Concurrently, the display medium simulator 17h switches the display in the window 13c according to the frequency supplied by the processor simulator 17e by way of the main program 17d, and set at the time when the power was turned off last time. In other words, the display medium simulator 17h converts the data on the frequency into corresponding graphic data for 7-segment digit presentation at the instance when the clock data stored in the memory area (not shown) of the RAM 23 allocated to the liquid crystal display is replaced by data representing the frequency set at the time when the power was turned off the last time. The display medium simulator 17h then supplies the graphic data and the data for "MHz" to the window system 17b, which by turn causes the window 13c of the display unit 13 to display digits representing the frequency and "MHz" as illustrated in FIG. 2 (ST7).

If the UP key is pointed to in the window 13a by the mouse 14 under this condition, the key operated in ST1 through 4 above is identified. As the UP key is identified, the processor simulator 17e sets, for instance, data "1008" in the PLL circuit included in the circuit block simulator 17j by incrementing data "1007" by "1" which is currently found in the PLL circuit (ST8). The circuit block simulator 17j then causes the target apparatus to tune in the newly set frequency in accordance with the data in the PLL circuit (ST9). At this time, the processor simulator 17e increases the data "90.0", which represents the current frequency stored in the RAM 23, to "90.1". Then, the display medium simulator 17h converts the data in the RAM 23 into graphic data for 7-segment digit presentation, which are accordingly sent to the window 13c for display by way of the window system 17b. Thus, the currently displayed "90.0 MHz" is switched to "90.1 MHz" (ST10). If the UP key is depressed again, the above operation is repeated to increment the frequency figure in the window 13c by 0.1.

By pointing to a particular key by the mouse 14 among the keys displayed in the window 13a in the above described manner, the related simulators carry out given operations and the results of the operations are displayed in the respective windows.

If the display unit shows a set of data as illustrated in FIG. 2 and "CALL XXX" is pointed to in the window 13d for the source program being executed, the processor debugger 17i halts the execution of the program at the pointed step and the window 13f displays the contents of the program counter and the related registers at that moment.

Since the above described embodiment comprises a processor simulator 17e, a processor input/output section 17f, a matrix input/output section 17g, a display medium simulator 17h, a circuit block simulator 17j and a mechanical block simulator 17k as well as other components, it can simulate not only the processors of a target apparatus but also peripheral devices such as a liquid crystal display on a real-time basis. Thus, it can be suitably used to simulate the operation of the target apparatus in various aspects not only in initial stages but in any stages of software development.

Advantageously, the display unit 13 can display not only source programs, dumped memories, entered commands and the contents of registers but also the statuses of various operating sections and the liquid crystal display of the target apparatus. Therefore, the embodiment allows the user to see the results of simulating operation on a real-time basis with a feeling as if he or she is actually using the target apparatus, offering a great convenience to the user.

While a single processor is incorporated in the target apparatus in the above description, the embodiment can simulate the operation of more than one processors without any problem if the target apparatus comprises a number of processors.

The number of windows and the type of data to be displayed on each of the windows are not limited to those of FIG. 2 and may be altered by the user whenever necessary.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A visual simulation apparatus comprising:

a control unit;

a display unit, connected to said control unit, for displaying at least first, second and third windows in which data are displayed;

a designating device, connected to said control unit, for designating data displayed on said first, second and third windows; and a memory unit, connected to said control unit, for storing first to fourth simulators and a window controller, wherein;

said first simulator simulates the operation of a processor incorporated in a target apparatus, said processor including an arithmetic logical unit, a memory connected to the arithmetic logical unit and an input/output control section connected to the arithmetic logical unit;

said second simulator simulates the input and output signals passing through an input/output terminal connected to said input/output control section of said processor;

said third simulator simulates the operation of a key matrix connected to the processor of said target apparatus;

said fourth simulator simulates the operation of a display element of said target apparatus; and said window controller outputs the results of simulation simulated by said control unit to said display unit, wherein said display unit displays each of the results of simulation supplied form the window controller to each of said first to third windows.

2. An apparatus according to claim 1, wherein said memory unit further includes a processor debugger for debugging the operation of said processor.

3. An apparatus according to claim 1, wherein said display unit further includes a fourth window for displaying a list of programs stored by the memory of target apparatus.

4. An apparatus according to claim 1, wherein said memory unit further includes:

a circuit block simulator for simulating the operation of the circuit blocks arranged in said target apparatus; and a mechanical block simulator for simulating the operation of the mechanical blocks arranged in said target apparatus.

5. An apparatus according to claim 1, wherein said memory unit further includes:

an environment block simulator for simulating the environmental factors of said target apparatus; and an analyzer for analyzing and evaluating the operation of said target apparatus.

6. An apparatus according to claim 1, wherein said display unit further includes a sixth window for displaying the contents of a registers including in the processor as a results of simulating operation.

7. A visual simulation apparatus comprising:

a control unit;

a display unit, connected to said control unit, for displaying first, second and third windows in which data are displayed;

a designating device, connected to said control unit, for designating data displayed on said first, second and third windows; and a memory unit, connected to said control unit, for storing first to fourth simulators and a window controller, wherein:

said first simulator simulates the operation of a processor incorporated in a radio set, said processor including an arithmetic logical unit, a memory connected to the arithmetic logical unit and an input/output control section connected to the arithmetic logical unit, said first simulator simulating the operation of said processor;

said second simulator simulates the input and output signals passing through an input/output terminal connected to said input/output control section of said processor;

said third simulator simulates the operation of keys to be used for operating said radio set, said third simulator supplying the results of simulation to said second simulator;

said fourth simulator simulates the operation of the unit for 7-segment digit presentation of said radio set in accordance with the results of simulation transmitted from said first simulator; and said window controller outputs the results of simulation simulated by said control unit to said display unit, wherein said display unit displays each of the results of simulation supplied from the window controller to each of said first to third windows.

8. A visual simulation apparatus comprising:

a control unit;

a display unit, connected to said control unit, for displaying at least first, second and third windows in which data are displayed;

a designating device, connected to said control unit, for designating data displayed on said first, second and third windows;

a first simulator, connected to the control unit, for simulating the operation of a processor incorporated in a target apparatus, said first simulator comprising an arithmetic logical unit constituting a component of a processor, a memory for storing data for operating said processor and an input/output control section of said processor for controlling data input/output operations;

a second simulator, connected to the control unit, for simulating the input and output signals passing through an input/output terminal connected to said input/output control section of said processor;

a third simulator, connected to the control unit, for simulating the operation of a key matrix to be used for operating said target apparatus, said third simulator supplying the results of simulation to said second simulator;

a fourth simulator, connected to the control unit, for simulating the operation of the display unit of said target apparatus in accordance with the results of simulation transmitted from said first simulator; and a window controller, connected to the control unit, for displaying the results of simulation by said second simulator on said first window, those of simulation by said third simulator on said second window and those of simulation by said fourth simulator on said third window.

9. An apparatus according to claim 8, further comprising a processor debugger, connected to the control unit, for debugging the operation of said processor.

10. An apparatus according to claim 8, wherein said display unit further includes a fourth window for displaying a list of said programs and the results of debugging carried out by said debugger.

11. An apparatus according to claim 8, further, comprising:

a circuit block simulator, connected to the control unit, for simulating the operation of circuit blocks arranged in said target apparatus; and a mechanical block simulator, connected to the control unit, for simulating the operation of mechanical blocks arranged in said target apparatus.

12. An apparatus according to claim 8, further comprising:

an environment block simulator, connected to the control unit, for simulating environmental factors of said target apparatus; and an analyzer, connected to the control unit, for analyzing and evaluating the operation of said target apparatus.

13. An apparatus according to claim 8, wherein said display unit further includes a fifth window for displaying the contents of registers included in the processor as results of simulating operation carried out by said processor simulator.

14. A visual simulation apparatus comprising:

a control unit;

a display unit, connected to said control unit, for displaying at least first, second and third windows in which data are displayed;

a designating device, connected to said control unit, for designating data displayed on said first, second and third windows;

a first simulator, connected to the control unit, for simulating the operation of a processor incorporated in a radio set, said first simulator comprising an arithmetic logical unit constituting a component of said processor, a memory for storing data for operating said processor and an input/output control section of said processor for controlling a data input/output operation;

a second simulator, connected to the control unit, for simulating the input and output signals passing through an input/output terminal connected to said input/output control section of said processor;

a third simulator, connected to the control unit, for simulating the operation of keys to be used for operating said radio set, said third simulator supplying the results of simulation to said simulator;

a fourth simulator, connected to the control unit, for simulating the operation of the unit for 7-segment digit presentation of said radio set in accordance with the results of simulation transmitted from said first simulator; and a window controller, connected to the control unit, for displaying the results of simulation by said second simulator on said first window, those of simulation by said third simulator on said second window and those of simulation by said fourth simulator on said third window.

* * * * *